Nov. 18, 1969        L. B. BEATY         3,478,866
INSULATED CONTAINER FOR INFANT FOOD
Filed April 3, 1968

INVENTOR
LOIS B. BEATY
BY Lamont Johnston
ATTORNEY

United States Patent Office 3,478,866
Patented Nov. 18, 1969

3,478,866
INSULATED CONTAINER FOR INFANT FOOD
Lois B. Beaty, Rte. 3, Harrison Pike,
Cleveland, Tenn. 37311
Filed Apr. 3, 1968, Ser. No. 718,591
Int. Cl. A45c *11/20;* B65d *81/38*
U.S. Cl. 206—4                                                   1 Claim

ABSTRACT OF THE DISCLOSURE

An insulated compartmented container for keeping food warm, or cold, for several hours while traveling, especially for an infant's bottles of milk and water, jars of baby food, a feeding spoon, a bib and a washcloth.

BACKGROUND OF THE INVENTION

Since infants no longer nurse as much as they once did, they are fed prepared foods and juices, as well as milk formulas, at the early age of one month. In order to avoid the baby's having indigestion, or colic, these special foods have to be warmed, as do the baby's milk formula and juices. It is very difficult to feed the baby while traveling because of the steps necessary to warm bottles, etc. This is so, whether the traveling is being done by private automobile, bus, train or airplane.

With use of the invention described in the present application, the infant's food is already warmed and ready to serve from one compact container or box. Some prior devices are useful as far as bottle feeding is concerned, but babies today require more than just a bottle and, with the present invention, they have their needs for feeding in one compact insulated container, constructed of a material which will keep the food warm for at least 12 hours.

DESCRIPTION OF THE PREFERRED EMBODIMENT

Figure 2:
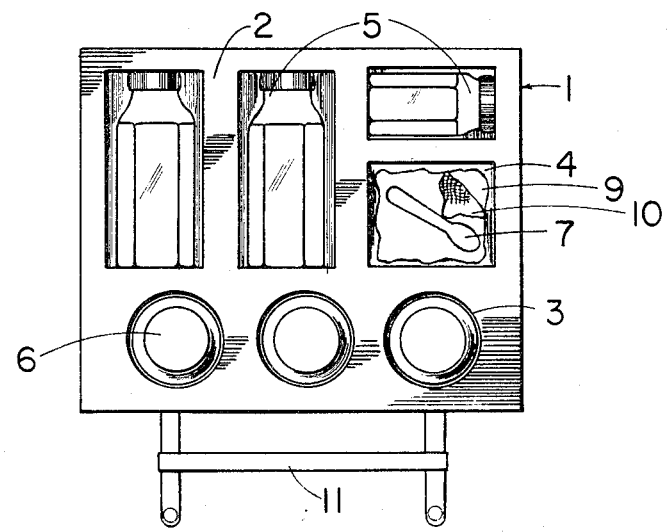
FIG. 2 is a plan view of the main body of the container, showing bottles, jars, a spoon, etc., in place in compartments provided for them.

There is shown in the drawing a container, generally indicated at 1, which is insulated from passage of heat. The insulation can be provided in any suitable manner, as by making the walls, bottom and lid of double-walled construction, with air spaces between the walls or with a heat-insulating material between the walls, such as cork, polyurethane foam or other heat-insulating material. The walls, bottom and lid can also be made of single-wall construction, in which the single wall is made of nonconductive material, such as styrofoam, polystyrene, polyurethane or other heat-insulating plastic material, paper board, papiermache, or the like. The container is divided into compartments by means of walls 2, forming small circular compartments 3 to contain, for example, jars 6 of baby food, such as strained baby food, and a somewhat larger compartment 4, as illustrated in FIG. 2, to hold a feeding spoon 7, a bib 9, a washcloth 10 and perhaps a jar opener or any other article useful with a baby, such as a pacifier, etc. The small compartments 3 extend vertically throughout a large part of the height of container 1 and are of such dimensions that they will hold rather snugly a few jars of baby food. Other compartments of suitable sizes are provided for baby bottles 5 for containing a baby's milk formula, juice and water.

Figure 1:
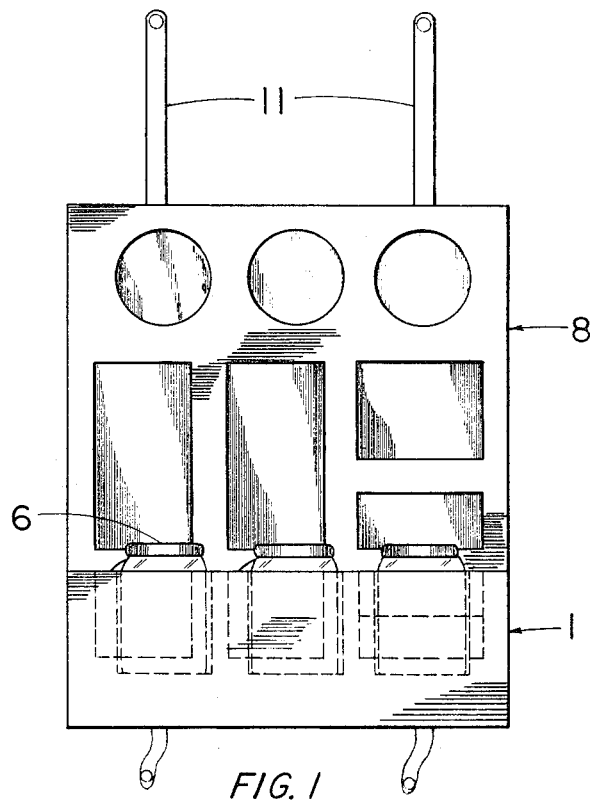
FIG. 1 is a front elevation of a container embodying the invention, with the lid raised to show recesses in the inside of the lid complementary to compartments in the main body of the container.

The lid 8 of the container, as shown in FIG. 1, is provided witth recesses complementary to the compartments 3 and 4 to allow adequate space and to hold the articles securely in place in the compartments. A suitable carrying handle or strap 11 may also be provided which holds the lid onto the main body and may be so designed as to serve as a hinge attaching the lid to the container.

It will be seen that, by this invention, there is provided a convenient and very useful container which is insulated to keep baby foods warm during a long period of up to about 12 hours, during which a mother would be apt to be traveling with her infant. Bottles and jars containing milk formula, juice, water, and baby food would be warmed thoroughly before leaving on the trip and would be promptly placed in the compartments 3 in the insulated container 1, and the lid 8 would be closed. The container would be carried by the strap 11 and, where space is at a premium, as it often is during traveling, the container can be placed upon the mother's lap, the lid 8 raised, and the necessary article removed from the container, after which the container may be placed upon the floor, a rack or perhaps a nearby vacant seat while the mother feeds the baby.

It will be apparent to those skilled in the art that various changes may be made in the invention, without departing from the spirit and scope thereof.

I claim:
1. A container for keeping infant food warm for several hours and for serving food directly from jars held by the container comprising an insulated main body, an insulated lid and a carrying strap holding and hinging the lid onto the main body, interior insulating dividing walls in the main body forming compartments for holding bottles of milk and water, jars of baby food to be served from directly while being held in the container compartments and a spoon, a bib and a washcloth, all in one and the same layer, the lid having formed in it recesses complementary to the compartments in the main body for holding the articles securely in place while being carried and for minimizing heat transfer.

References Cited

UNITED STATES PATENTS

| | | | |
|---|---|---|---|
| 2,555,788 | 6/1951 | Donaldson | 206—4 |
| 3,103,278 | 9/1963 | Kuzma et al. | 206—65 |
| 3,225,983 | 12/1965 | Majka | 220—9 |

WILLIAM T. DIXSON, Jr., Primary Examiner

U.S. Cl. X.R.

224—55